United States Patent
Bostick et al.

(10) Patent No.: US 10,410,183 B2
(45) Date of Patent: Sep. 10, 2019

(54) ELECTRONIC WASTE RECYCLING

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 15/165,093

(22) Filed: May 26, 2016

(65) Prior Publication Data

US 2017/0344959 A1 Nov. 30, 2017

(51) Int. Cl.
*G06Q 10/00* (2012.01)
*G06Q 30/02* (2012.01)
(Continued)

(52) U.S. Cl.
CPC .......... *G06Q 10/30* (2013.01); *G01C 21/343* (2013.01); *G06Q 30/0201* (2013.01);
(Continued)

(58) Field of Classification Search
None
See application file for complete search history.

(56) References Cited

U.S. PATENT DOCUMENTS

2009/0321511 A1* 12/2009 Browne ................. G06Q 10/30
235/375
2010/0228676 A1* 9/2010 Librizzi ................. G06Q 10/00
705/306

(Continued)

OTHER PUBLICATIONS

Susan A. Fredholm et al., Characterizing Architectural Options for Electronic Waste Recycling Systems, National Science Foundation Graduate Research Fellowship Program, the MIT-Portugal Program and HP, 2008 IEEE International Symposium on Electronics and the Environment, May 19-22, 2008.*

(Continued)

*Primary Examiner* — Christine M Behncke
*Assistant Examiner* — Matthew H Divelbiss
(74) *Attorney, Agent, or Firm* — Schmeiser, Olsen & Watts; Mark C. Vallone

(57) ABSTRACT

A method and system for recycling electronic waste is provided. The method includes detecting electronic devices at a location of a user of a mobile device. Identification data identifying each electronic device is retrieved and a status for each device is determined. The electronic devices are analyzed with respect to electronic waste data and values for the electronic devices are determined with respect to recycling options. A score for each electronic device is generated and a comparative analysis is executed for the electronic devices with respect to the values and recycling options. Recommendations associated with the values and recycling options are generated and presented to the user via the mobile hardware device. The user selects a recycling option with respect to the recommendations and a recycling process associated with the recycling option selection is enabled.

16 Claims, 6 Drawing Sheets

(51) Int. Cl.
*G06Q 50/18* (2012.01)
*H04W 4/021* (2018.01)
*H04W 4/80* (2018.01)
*G01C 21/34* (2006.01)

(52) U.S. Cl.
CPC .......... *G06Q 50/184* (2013.01); *H04W 4/021* (2013.01); *H04W 4/80* (2018.02); *Y02W 90/20* (2015.05)

(56) References Cited

U.S. PATENT DOCUMENTS

| | | | |
|---|---|---|---|
| 2011/0153508 A1* | 6/2011 | Jhunjhunwala | G06Q 30/02 705/306 |
| 2013/0198089 A1 | 8/2013 | Bowles | |
| 2015/0309912 A1 | 10/2015 | Nguyen et al. | |
| 2015/0324760 A1 | 11/2015 | Borowski et al. | |
| 2015/0339736 A1* | 11/2015 | Bennett | G06Q 30/016 705/306 |
| 2016/0232498 A1* | 8/2016 | Tomlin, Jr. | G06Q 10/30 |
| 2016/0292653 A1* | 10/2016 | Gonen | G06Q 10/30 |
| 2016/0371738 A1* | 12/2016 | Berry | G06Q 10/30 |

OTHER PUBLICATIONS

A.J. Welstead, Behind the Screens: Collecting Obsolete Electronic Equipment for Recycling, Lothian and Edinburgh Environmental Partnership, Scotland, Clean Electronics Products and Technology, Oct. 9-11, 1995, Conference Publication No. 415 © IEE 1995.*

* cited by examiner

ELECTRONIC WASTE RECYCLING

FIELD

The present invention relates generally to a method for recycling electronic waste and in particular to a method and associated system for detecting electronic devices and determining associated values with respect to recycling and resale options.

BACKGROUND

Eliminating waste associated with devices typically includes an inaccurate process with little flexibility. Determining locations for disposing of device based may include a complicated process that may be time consuming and require a large amount of resources. Typical disposal techniques may not take into account appropriate incentives and therefore may not result in efficient actions. Accordingly, there exists a need in the art to overcome at least some of the deficiencies and limitations described herein above.

SUMMARY

A first aspect of the invention provides an electronic device waste recycling method comprising: detecting via a sensor of a mobile hardware device, by a processor of the mobile hardware device, a plurality of electronic devices at a location associated with a user of the mobile hardware device; retrieving, by the processor via the sensor, identification data identifying each device of the plurality of electronic devices; determining, by the processor via the sensor, a status for each the device; analyzing, by the processor based on the identification data and each the status, the plurality of electronic devices with respect to electronic waste data in an electronic waste repository; determining, by the processor, values for the plurality of electronic devices with respect to recycling options; generating, by the processor based on the values, a score for each electronic device of the plurality of electronic devices with respect to the values and the recycling options; executing, by the processor based on each the score, a comparative analysis for the plurality of electronic devices with respect to the values and the recycling options; generating, by the processor based on results of the comparative analysis, recommendations associated with the values and the recycling options; presenting, by the processor to the user via the mobile hardware device, the recommendations; receiving, by the processor from the user via the mobile hardware device, a recycling option selection with respect to the recommendations; and enabling, by the processor, a recycling process associated with the recycling option selection.

A second aspect of the invention provides an electronic device waste recycling method comprising: detecting via a sensor of a mobile hardware device, by a processor of the mobile hardware device, a plurality of electronic devices at a location associated with a user of the mobile device; retrieving, by the processor via the sensor, identification data identifying each device of the plurality of electronic devices; determining, by the processor, a usage pattern for a first device of the plurality of electronic devices; analyzing, by the processor, Internet content sources with respect to a lifespan for the first device based on a user type of the user and the usage pattern; generating, by the processor based on results of the analyzing, recommendations associated with recycling the first device; and presenting, by the processor to the user via the mobile hardware device, the recommendations.

A third aspect of the invention provides a computer program product, comprising a computer readable hardware storage device storing a computer readable program code, the computer readable program code comprising an algorithm that when executed by a processor of a mobile hardware device implements an electronic device waste recycling method, the method comprising: detecting via a sensor of the mobile hardware device, by the processor, a plurality of electronic devices at a location associated with a user of the mobile hardware device; retrieving, by the processor via the sensor, identification data identifying each device of the plurality of electronic devices; determining, by the processor via the sensor, a status for each the device; analyzing, by the processor based on the identification data and each the status, the plurality of electronic devices with respect to electronic waste data in an electronic waste repository; determining, by the processor, values for the plurality of electronic devices with respect to recycling options; generating, by the processor based on the values, a score for each electronic device of the plurality of electronic devices with respect to the values and the recycling options; executing, by the processor based on each the score, a comparative analysis for the plurality of electronic devices with respect to the values and the recycling options; generating, by the processor based on results of the comparative analysis, recommendations associated with the values and the recycling options; presenting, by the processor to the user via the mobile hardware device, the recommendations; receiving, by the processor from the user via the mobile hardware device, a recycling option selection with respect to the recommendations; and enabling, by the processor, a recycling process associated with the recycling option selection.

The present invention advantageously provides a simple method and associated system capable of eliminating waste associated with devices.

DETAILED DESCRIPTION

Figure 1:
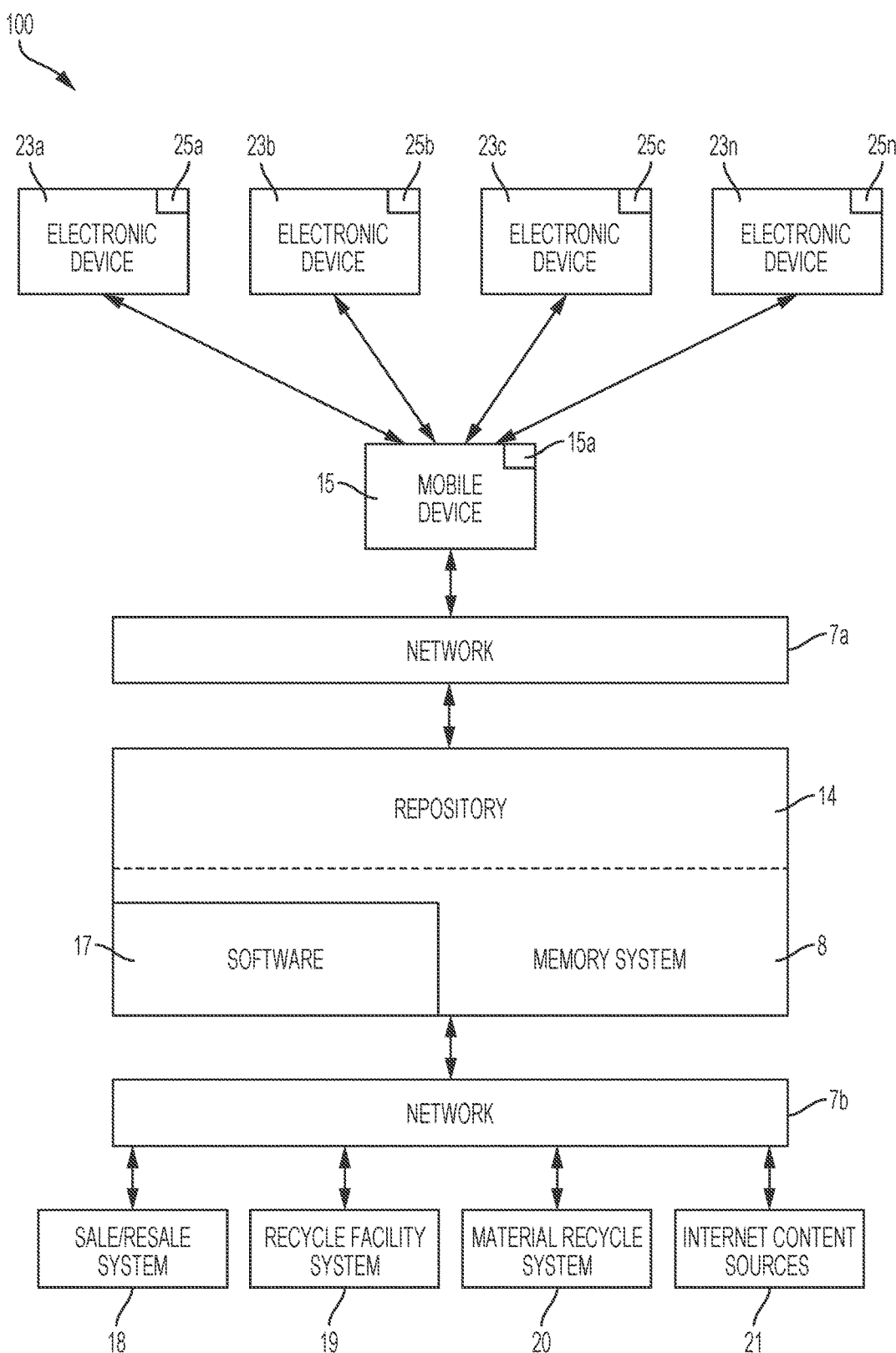
FIG. 1 illustrates a system for detecting electronic devices and determining associated values with respect to recycling options, in accordance with embodiments of the present invention.

FIG. 1 illustrates a system 100 for detecting electronic devices 23a . . . 23n and determining associated values with respect to recycling options, in accordance with embodiments of the present invention. System 100 enables a process for providing electronic devices 23a . . . 23n comprising sensors 25a . . . 25n wirelessly connected to a sensor 15a of a mobile device 15 thereby allowing electronic devices 23a . . . 23n to be:

1. Identified within a home or office setting.
2. Tracked for a status and usage patterns.
3. Valued with respect to resale or a recycling incentive via analysis of market conditions.

Additionally, system 100 enables a process for presenting (to a user) the following information with respect to a determined recycling value for electronic devices 23a . . . 23n:

1. Identification of precious metals within electronic devices 23a . . . 23n (e.g., silver, copper, platinum, hazardous materials (e.g., lead).
2. Identification of second hand value and associated buyers.
3. Identification of royalty points issued for recycling electronic devices 23a . . . 23n (e.g., with respect to a town or county or a manufacturer)
4. Identification of trade-in points for trading in electronic devices 23a . . . 23n at specific retailers.
5. Identification of recycling location drop off points.
6. Comparative analysis results with respect to a second hard value vs royalty or reward points accumulated to purchase future electronic goods.
7. Information for manufacturers with respect to electronic devices 23a . . . 23n in use vs sitting idle.
8. Information associated with a current insurance industry value of electronic devices 23a . . . 23n for specified date range.
9. Information associated with existing products (electronic devices) used to promote sale of new products.
10. Information identifying electronic waste collection centers for electronic parts for specified users with accumulated royalty value points plotted on electronic map with a route generated for efficient pickup and disposal of the electronic waste.

System 100 of FIG. 1 includes a mobile device 15 (detecting and identifying electronic devices 23a . . . 23n and associated locations) connected through a network 7a to a repository system 14. Additionally, system 100 comprises a sale/resale system 18, a recycling facility system 19, a material recycle system 20, and Internet content sources 21 connected through a network 7b to repository system 14. Mobile device 15, repository 14, sale/resale system 18, recycling facility system 19, material recycle system 20, and Internet content sources 21 each may comprise an embedded computer. An embedded computer is defined herein as a remotely portable dedicated computer comprising a combination of computer hardware and software (fixed in capability or programmable) specifically designed for executing a specialized function. Programmable embedded computers may comprise specialized programming interfaces. Additionally, electronic devices 23a . . . 23n, mobile device 15, repository 14, sale/resale system 18, recycling facility system 19, material recycle system 20, and Internet content sources 21 may each comprise a specialized hardware device comprising specialized (non-generic) hardware and circuitry (i.e., specialized discrete non-generic analog, digital, and logic based circuitry) for executing a process described with respect to FIGS. 1-3. The specialized discrete non-generic analog, digital, and logic based circuitry may include proprietary specially designed components (e.g., a specialized integrated circuit designed for only implementing an automated process for enabling a process for detecting electronic devices and determining associated values with respect to recycling options). Repository 14 includes a memory system 8 and software 17 for enabling a process for an automated process for enabling a process for detecting electronic devices and determining associated values with respect to recycling options. Mobile device comprises a sensor 15a for detecting electronic devices 23a . . . 23n via sensors 25a . . . 25n of electronic devices 23a . . . 23n. Sensors may include, inter alia, GPS sensors, temperature sensors, infrared sensors, motion sensors, RFID sensors, Bluetooth sensors, NFC sensors, etc.). The memory system 8 may include a single memory system. Alternatively, the memory system may include a plurality of memory systems. Network 7a and 7b may be comprised by a single network. Alternatively, each of network 7a and 7b may comprises and independent network. Network 7a and 7b may include any type of network including, inter alia, a local area network, (LAN), a wide area network (WAN), the Internet, a wireless network, etc.

System 100 of FIG. 1 enables a process for collecting information associated with electronic devices or internal components of the electronic devices as well as a status of the electronic devices (e.g., a power status, a condition, etc.) wirelessly from via internal sensors installed within the electronic devices. The collected information enables a search of an online electronic waste repository to determine a resale value or a recycling royalty point's value that may be used for trade-in with a retailer or agency. Additionally, a comparative analysis may be executed to determine a recommended option for the user with respect to an electronic device. System 100 additionally enables a process for displaying an electronic waste value (e.g., resale value or a recycling royalty point's value) and associated recycling options for internal electronic parts for a user in a home or office location with following attributes:

1. Device resale value.
2. Device recycle points (individual and aggregated).
3. Device trade-in points (individual and aggregated)
4. A device e-waste pickup location.
5 A device e-waste pickup request.

System 100 further enables provides an electronic waste management collection agency with information regarding a location of users and associated electronics (and aggregated royalty value) requested for pickup. An electronic waste collection route (for identified users) is plotted on an electronic map comprising a route generated for efficient pickup and disposal of the electronic waste.

Repository 14 enables a search process with respect to the following:

1. Electronic device waste based on a part number or description. For example, a search may return information regarding precious metals or hazardous materials within an electronic device.
2. Second hand value and associated buyers for the electronic device.
3. Monitory based points with respect to an electronic device available for recycling or trade in at specific retailers.
4. Recycle center locations.
5. Electronic waste data associated with devices and obtained from a home or office computer sharing a network with electronic devices or mobile device.
6. A network scan for detection of electronic devices connected to the network.
7. A search for electronic waste via a part number in an electronic waste repository to determine a second hand value and associated buyers, recycling value in points, and locations for drop off or notification for pickup of electronic waste.
8. A search of a user's itemized list of electronic parts.
9. A user's location with respect to electronic devices available for recycling pickup.
10. A process to identify user electronic waste profiles on a map and an efficient route to collect electronic waste.

The following steps illustrate a process for detecting electronic devices (e.g., electronic devices 23a . . . 23n) and determining associated values with respect to recycling options as follows:

1. A user profile defining a location for electronic devices (e.g., home, office, etc.) is generated.
2. Data associated with the electronic devices and associated internal parts are retrieved. For example, electronic devices or associated parts may comprise sensors enabling a wireless communication process for presenting electronic device related data such as, inter alia, a manufacturer, a model, a part number, etc. Sensors may include, inter alia, an RFID sensor, a Bluetooth or Wi-Fi sensor, etc. The sensors may be integral with the electronic devices. Alternatively, the sensors may be installed on the electronic devices. Additionally, a software application (on a computer or mobile device in a home or office network may scan an associated network to identify electronic devices and an associated state of operation (e.g., power functions, usage patterns, etc.). Furthermore, video devices (e.g., a camera) installed with respect to a home network may be enabled to identify electronic waste and assess the item to determine if it may be considered as electronic waste. For example, a desktop monitor in an office sitting on a floor has not been used for more than 4 months so therefore, the monitor is considered to be electronic waste.
3. An electronic device status is determined by tracking a current status for each of the electronic devices or associated parts. For example, it is determined that: there is no ink in a printer cartridge, a specified mobile phone has not been used for a specified time frame, a mobile device battery is defective, etc. A current status/life for every electronic part may be presented via a home or office network. Associated patterns of use may be used to determine if a user is likely to recycle an electronic device.
4. An electronic waste repository search is conducted with respect to an electronic device via an identification means (e.g., a part number) to obtain information regarding a second hand value, royalty points for recycling, etc. Additionally, a home or office device may retrieve information from each electronic device to evaluate data in order to locate electronic parts and or devices comprising a market value for a second hand user or as electronic waste for recycling.
5. A user may interact with a Web or mobile application interface to view any located electronic devices associated with a user profile. Each recyclable electronic device will earn points and the aggregated points will be displayed for the user on a display. The user may redeem the points by submitting the recyclable electronic devices to an appropriate agency(s). Additionally, the user may use earned points obtain a discount when purchasing future devices.
6. A value for electronic devices may be determined by executing a comparative analysis with respect to a second hand value vs royalty or reward points accumulated to determine a value for itemized electronic devices and the royalty or reward points are aggregated for use towards a purchase of future electronic devices. Additionally, users may drop off electronic waste directly at defined locations or may request a pick up. The request is transmitted to an electronic waste management service to identify a user location for collection.
7. Electronic devices may be collected in response to requests from users. Electronic waste collection agencies (e.g., recycling facilities) may be notified that different users in differing locations have scheduled electronic device pickups and in response, the electronic waste collection agencies generate a travel route to collect the electronic devices. The travel route may be optimized e based on accumulated value points. The optimized route is plotted on a map.

System 100 executes a real time search for available electronic devices, generates a score associated with current electronic device values, and executes a comparative analysis process as follows:

The real time search for current electronic devices is executed via a sensor scan process. The process for determining a score associated with current electronic device values comprises determining a resale value and associated score, a material value and associated score, and a trade in value and associated score. A resale value scoring process may include:

1. Determining a value and associated score based on a condition associated with an electronic device e.g., (poor, fair, good, excellent, etc.).
2. Determining a real time value and availability date associated with a recycling reseller. A user profile indicating criteria for resellers may be generated in order to provide reseller specifics. Criteria may include data indicating: a preferred reseller, resellers in a specific location (i.e., resellers may receive different scores depending on a location), etc.

A material value scoring process may include:

1. Determining a value and associated score indicating a current market value for precious metals and/materials within electronic devices for recycling.
2. Determining a real time value and availability date associated with a material reseller. A user profile indicating criteria for material reseller may be generated in order to provide material reseller specifics. Criteria may include data indicating: a preferred material reseller, material resellers in a specific location (i.e., resellers may receive different scores depending on a location), etc.

A trade-in incentive/value scoring process may include:
1. Determining a value and associated score indicating manufacturer of devices incentives to retain customers.

A comparative analysis process may determine a recommended option for recycling electronic devices based on the aforementioned scoring processes in combination with the aforementioned user profile preferences and current market conditions.

An electronic device value and associated lifecycle may be determined with respect to social network and or Web feedback. An associated lifecycle may vary depending on a usage pattern of a user. For example, a software game developer may require a high end computer and another user require a generic computer for checking email, social networks, etc. Electronic device usage patterns are determined and a search is performed with respect to social media/blog/manufacturer, etc. to determine a useful lifecycle from different sources to advise an associated user. The usage patterns may be used to determine if a user should consider a trade in of an electronic device with respect to its current value or continue using the electronic device for its associated lifecycle.

Additionally, system 100 enables a process for determining a usage pattern and associated lifecycle as follows:

1. Electronic devices are scanned and identified as described, supra.
2. Electronic device usage patterns for a current user are determined. The usage patterns may be determined by, inter alia, a software tracking process, a task tracking process, a frequency of use tracking process, etc. Alternatively, usage patterns may be determined via a user survey. Determined usage patterns may be store locally or within a user profile on remote system.
3. Internet content sources (e.g., social media, blogs, manufacturer reviews, etc.) are queried to determine electronic device useful lifecycles for different user types.
4. The determined useful lifecycles are presented to the associated users. Additionally, recommended recycling options based usage patterns are presented to the users.

Figure 2:
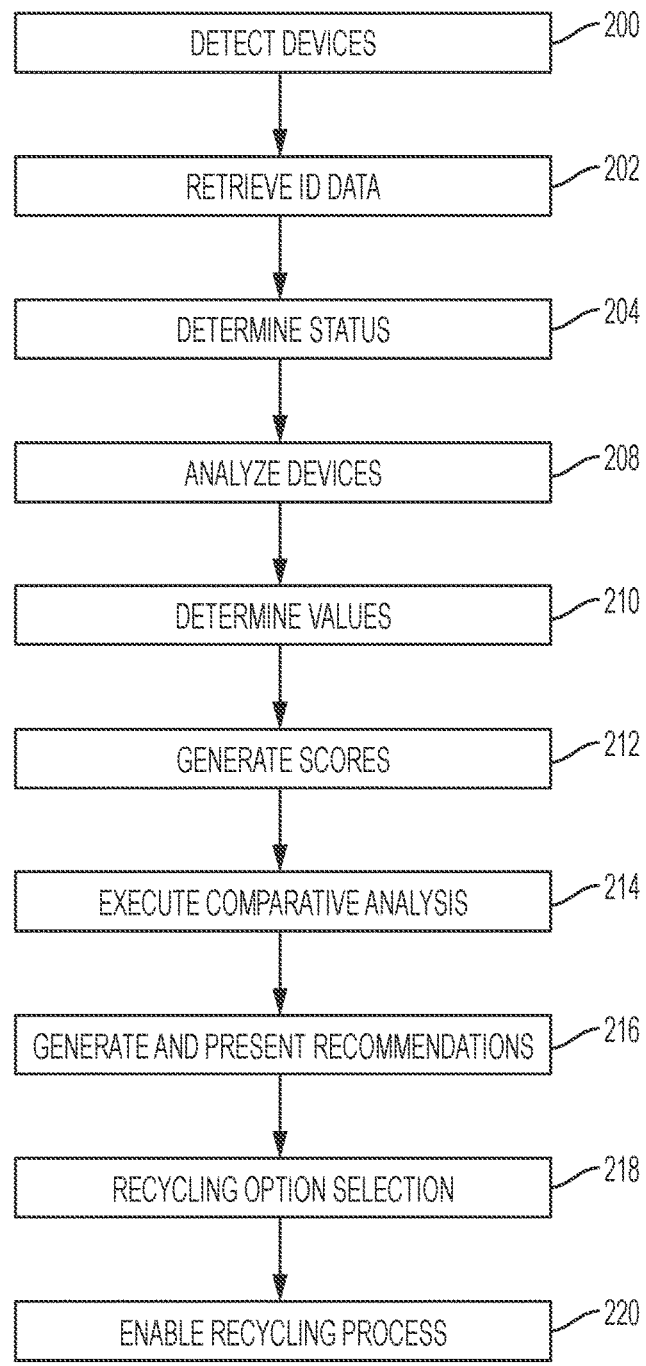
FIG. 2 illustrates an algorithm detailing a process flow enabled by the system of FIG. 1 for detecting electronic devices and determining associated values with respect to recycling options, in accordance with embodiments of the present invention.

FIG. 2 illustrates an algorithm detailing a process flow enabled by system 100 of FIG. 1 for detecting electronic devices and determining associated values with respect to recycling options, in accordance with embodiments of the present invention. Each of the steps in the algorithm of FIG. 2 may be enabled and executed in any order by a computer processor(s) executing computer code. In step 200, electronic devices at a location associated with a user of a mobile hardware device are detected via a sensor comprised by or integrated with the mobile hardware device. The sensor may comprise an RFID tag reader, a Wi-Fi sensor, a Bluetooth sensor, etc. In step 202, identification data identifying each device is retrieved via the sensor. In step 204, status for each device is determined. The status may indicate a power status for each device, a condition of each device, a device usage status for device, etc. In step 208, the electronic devices are analyzed with respect to electronic waste data in an electronic waste repository. The analysis is performed with respect to the identification data and each determined status. In step 210, values for the electronic devices are determined with respect to recycling options. The values may be determined by:
1. Determining current resale values the electronic devices.
2. Determining material values for materials comprised by the electronic devices.
3. Determining current trade in values for the electronic devices.
4. Determining recycling royalty values associated with recycling the electronic devices.

Determining current resale values may include determining a current physical and operating condition for the electronic devices and analyzing a profile (e.g., including resale vendor criteria associated with user preferred resale vendors and resale vendors located within a specified geographical area) the user. Determining material values may include identifying precious metal values for precious metals of the electronic devices and analyzing a profile (e.g., including resale vendor criteria associated with user preferred resale vendors and resale vendors located within a specified geographical area) the user. Determining material values may include identifying retailer or manufacturer customer retention incentives associated with retailers or manufactures associated with the electronic devices and analyzing a profile (e.g., including resale vendor criteria associated with user preferred resale vendors and resale vendors located within a specified geographical area) the user.

In step 212, a score for each electronic device is generated (based on the determined values) with respect to the values and recycling options. In step 214, a comparative analysis process for the electronic devices with respect to the values and recycling options is executed based on each score. In step 216, recommendations associated with the values and recycling (or resale) options are generated and presented (via the mobile hardware device) based on results of the comparative analysis process. In step 218, a recycling option with respect to the recommendations is selected from the user via the mobile hardware device. The recycling option selection may include selecting an e-waste pickup option with respect to retrieval of the electronic devices and in response the recycling process may include generating an optimal travel route for traveling between a recycling facility and the user location for retrieval of at least one of the electronic devices. The optimal travel route may be presented to a driver associated with the recycling facility. Alternatively, the recycling option may include an option for reselling the electronic device(s). In step 220, a recycling (or resale) process associated with the recycling option selection is enabled.

Figure 3:
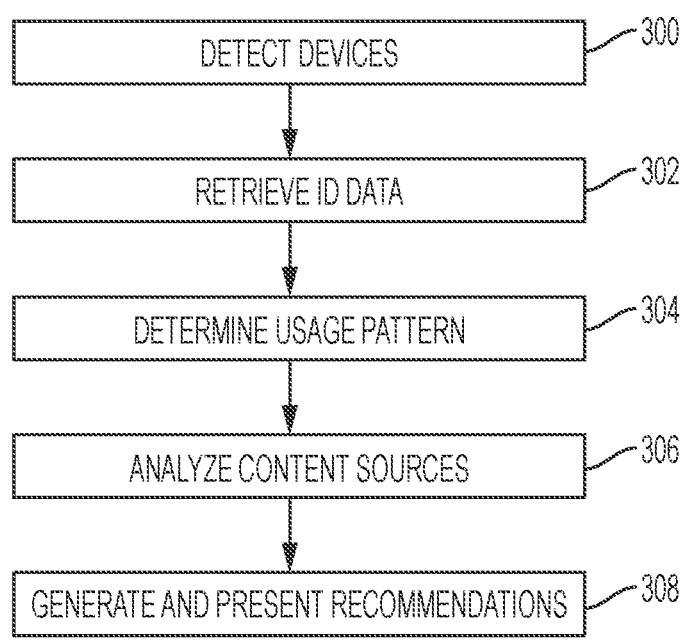
FIG. 3 illustrates an alternate algorithm to the algorithm of FIG. 2, in accordance with embodiments of the present invention.

FIG. 3 illustrates an alternate algorithm from the algorithm of FIG. 2 detailing a process flow enabled by system 100 of FIG. 1 for detecting electronic devices and determining associated values with respect to recycling options, in accordance with embodiments of the present invention. Each of the steps in the algorithm of FIG. 3 may be enabled and executed in any order by a computer processor(s) executing computer code. In step 300, electronic devices at a location associated with a user of a mobile hardware device are detected via a sensor comprised by or integrated with the mobile hardware device. The sensor may comprise an RFID tag reader, a Wi-Fi sensor, a Bluetooth sensor, etc. In step 302, identification data identifying each device is retrieved via the sensor. In step 304, a usage pattern for a device of the electronic devices is determined. Determining the usage pattern may comprise tracking software usage, tasks, or usage frequency of the electronic devices. Alternatively, determining the usage pattern may comprise presenting (via the mobile hardware device) a survey associated with usage of the electronic devices and retrieving responses to the survey from the user. In step 306, Internet content sources are analyzed with respect to a lifespan for the electronic devices based on a user type and the usage pattern. In step 308, recommendations associated with recycling the electronic devices are generated and presented based on results of the analyses of step 306.

Figure 4:
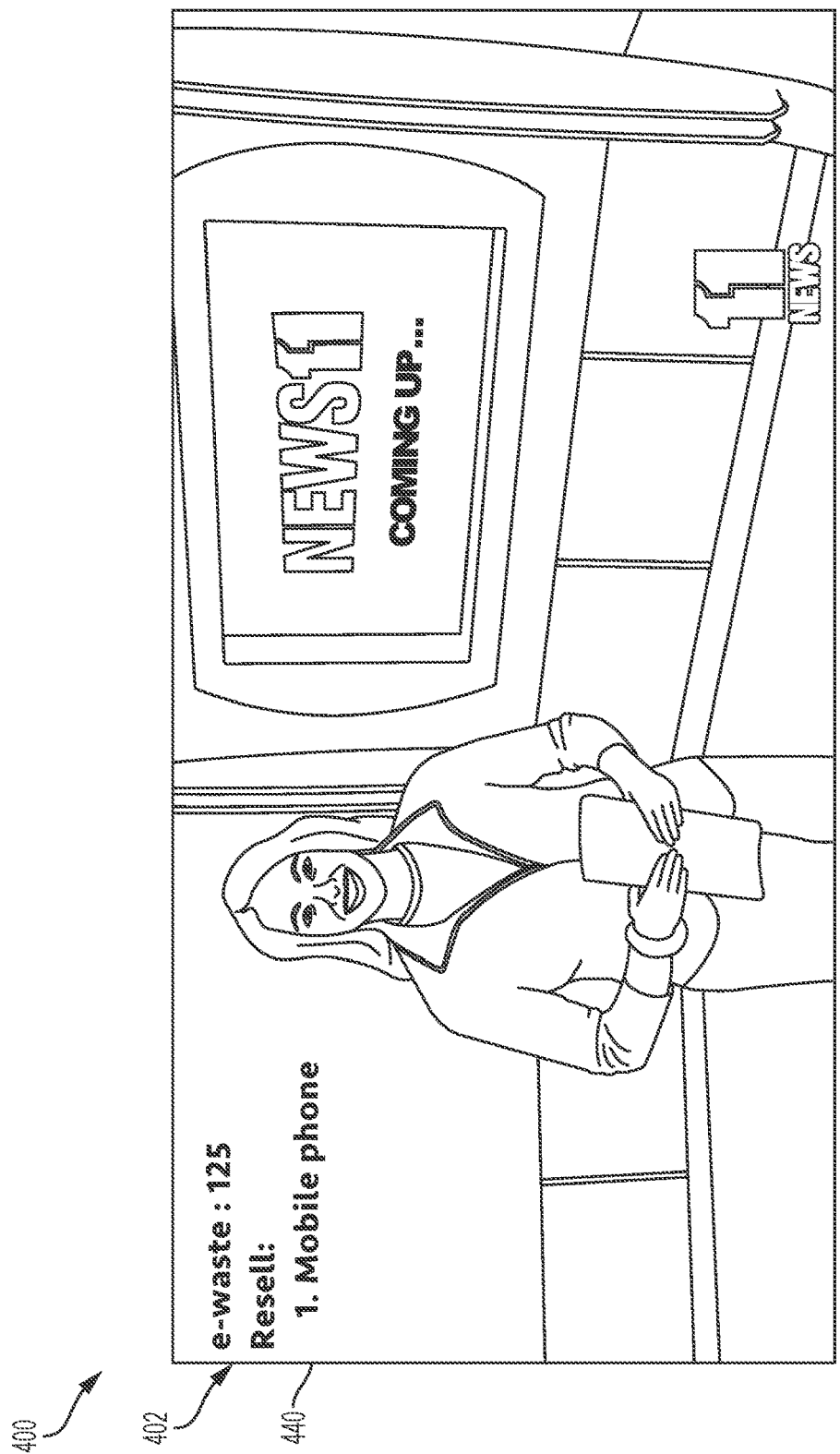
FIG. 4 illustrates a graphical user interface presenting accumulated points for recyclable e-waste, in accordance with embodiments of the present invention.

FIG. 4 illustrates a graphical user interface 400 presenting accumulated points 402 for recyclable e-waste 440, in accordance with embodiments of the present invention. Accumulated points 402 (i.e., 125 points) identify the value for the recyclable e-waste 440 (e.g., electronic items or parts in this example a mobile phone) and a market (resale) recommendation is presented.

Figure 5:
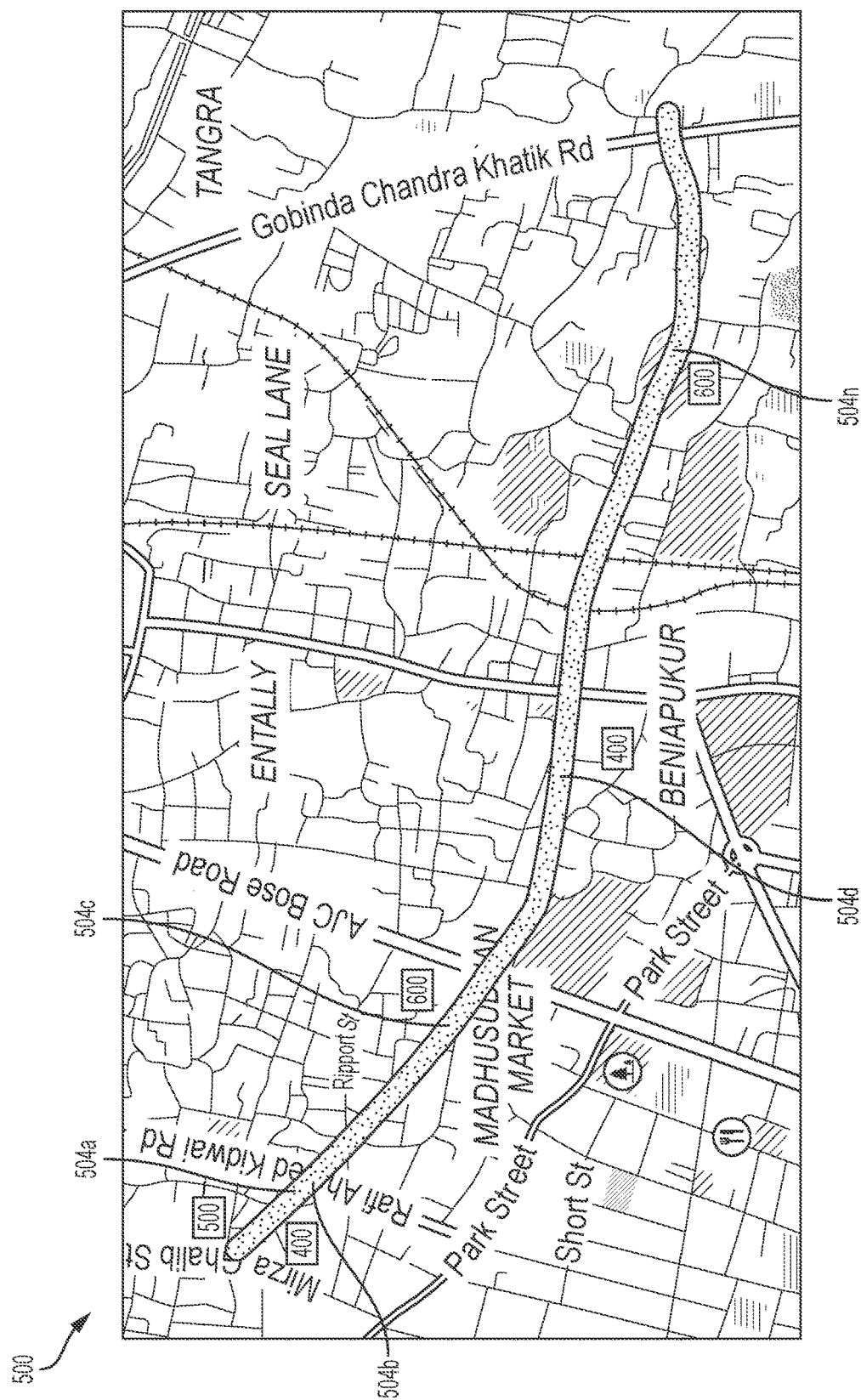
FIG. 5 illustrates a map presenting a generated route for retrieving electronic device e-waste, in accordance with embodiments of the present invention.

FIG. 5 illustrates a map 500 presenting generated route 504 for retrieving electronic device e-waste, in accordance with embodiments of the present invention. Route 504 illustrates pickup points 504a . . . 504n each illustrating a determined point value (e.g., pickup point 504a comprises an electronic device determined point value of 500) to determine an order of pickup.

Figure 6:
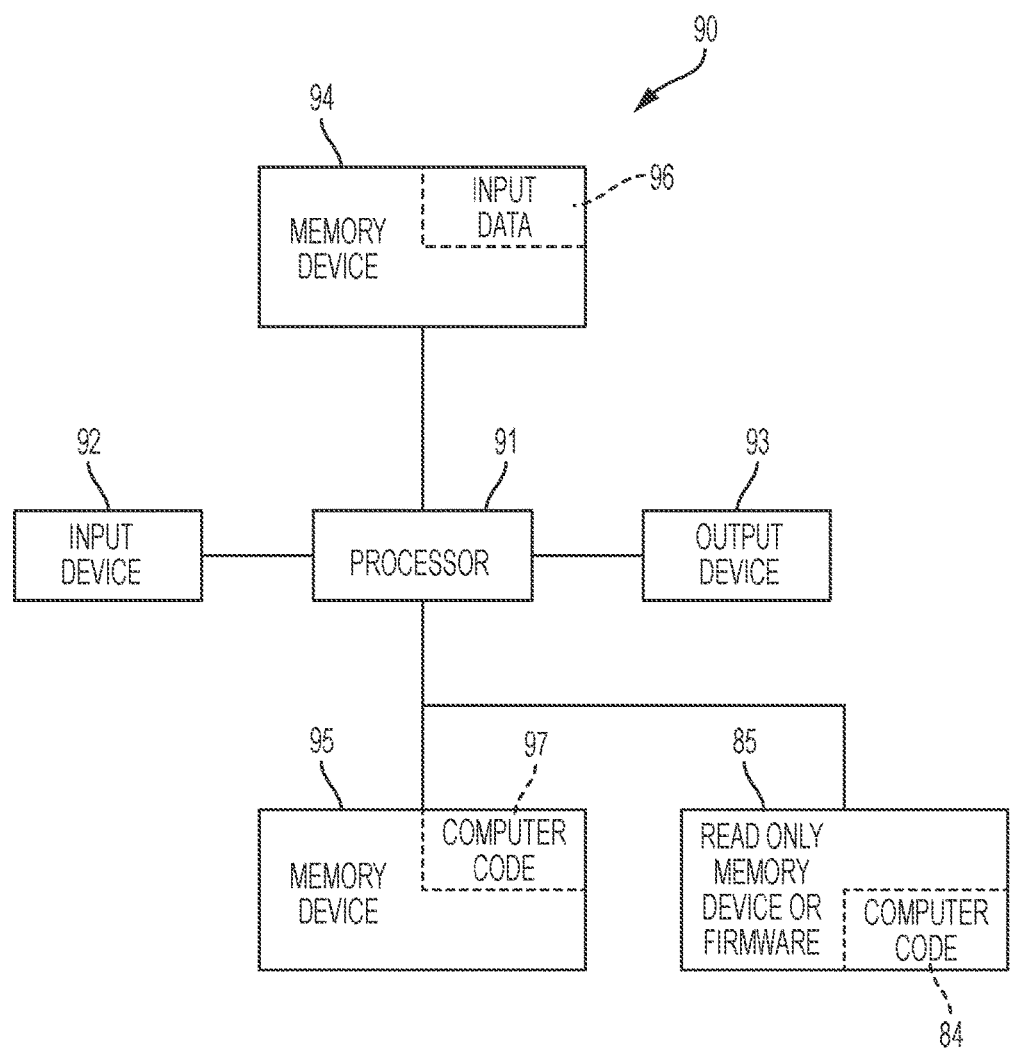
FIG. 6 illustrates a computer system for enabling a process for detecting electronic devices and determining associated values with respect to recycling options, in accordance with embodiments of the present invention.

FIG. 6 illustrates a computer system 90 (e.g., mobile device, repository 14, electronic devices 25a . . . 25n, sale/resale system 18, recycle facility system 19, material recycle system 20, and Internet content sources 21) used by or comprised by the system of FIG. 1 for enabling a process for detecting electronic devices and determining associated values with respect to recycling options, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 6 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-3) for enabling a process for detecting electronic devices and determining associated values with respect to recycling options. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include the algorithms of FIGS. 2-3 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithms of FIGS. 2-3) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 97 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to detect electronic devices and determine associated values with respect to recycling options. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for detecting electronic devices and determining associated values with respect to recycling options. In another embodiment, the invention provides a business method that performs the process steps of the invention on a subscription, advertising, and/or fee basis. That is, a service supplier, such as a Solution Integrator, could offer to enable a process for detecting electronic devices and determining associated values with respect to recycling options. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An electronic device waste recycling method comprising:
   detecting and sensing via a wireless sensor of a specialized mobile hardware device comprising special purpose hardware, by a processor of the mobile hardware device via a network scan, a plurality of electronic devices at a location associated with a user of said specialized mobile hardware device, wherein said special purpose hardware comprises electronic circuitry comprising a programmable logic array utilizing state information of specialized firmware program code configured to execute specialized software for personalizing said electronic circuitry for performing said electronic device waste recycling method;
   retrieving, by said processor via said wireless sensor, identification data identifying each device of said plurality of electronic devices;
   tracking, by said processor via said wireless sensor, a status for each said device, wherein said status indicates a power function status for each said device, a condition of each said device, a frequency of use status for each said device, and a device usage status for each said device;
   analyzing, by said processor based on said identification data and each said status, said plurality of electronic devices with respect to electronic waste data in an electronic waste repository;
   identifying, by said processor via said wireless sensor, precious metals within said plurality of electronic devices;
   determining, by said processor, values for said plurality of electronic devices with respect to recycling options;
   generating, by said processor based on said values, a score for each electronic device of said plurality of electronic devices with respect to said values and said recycling options;
   executing, by said processor based on each said score, a comparative analysis for said plurality of electronic devices with respect to said values, said precious metals, and said recycling options;
   generating, by said processor based on results of said comparative analysis, recommendations associated with said values and said recycling options;
   presenting, by said processor to said user via said mobile hardware device, said recommendations;
   receiving, by said processor from said user via said mobile hardware device, a recycling option selection with respect to said recommendations, wherein said recycling option selection comprises selecting an e-waste pickup option with respect to said plurality of electronic devices; and enabling, by said processor, a recycling process associated with said recycling option selection, wherein said recycling process comprises:

generating an optimal travel route for traveling between a recycling facility and said location associated with said user for retrieval of at least one of said plurality of electronic devices;

presenting said optimal travel route to a driver associated with said recycling facility; and directing said driver such that said driver retrieves said at least one of said plurality of electronic devices and travels from said location to said recycling facility via said optimal travel route for disposal of said at least one of said plurality of electronic devices at said recycling facility.

2. The method of claim 1, wherein said sensor is selected from the group consisting of an RFID tag reader, a Wi-Fi sensor, and a Bluetooth sensor.

3. The method of claim 1, wherein said determining said values for said plurality of electronic devices comprises:

determining current resale values for said plurality of electronic devices;

determining material values for materials comprised by said plurality of electronic devices;

determining current trade in values for said plurality of electronic devices; and determining recycling royalty values associated with recycling said plurality of electronic devices.

4. The method of claim 3, wherein said determining current resale values comprises;

determining a current physical and operating condition for said plurality of electronic devices; and analyzing a profile of said user, wherein said profile comprises resale vendor criteria associated with user preferred resale vendors and resale vendors located within a specified geographical area.

5. The method of claim 3, wherein said determining material values comprises;

identifying precious metal values for said precious metals comprised by said plurality of electronic devices; and analyzing a profile of said user, wherein said profile comprises resale vendor criteria associated with user preferred resale vendors and resale vendors located within a specified geographical area.

6. The method of claim 3, wherein said determining material values comprises;

identifying retailer or manufacturer customer retention incentives associated with retailers or manufactures associated with said plurality of electronic devices; and analyzing a profile of said user, wherein said profile comprises resale vendor criteria associated with user preferred resale vendors and resale vendors located within a specified geographical area.

7. The method of claim 1, further comprising:

providing at least one support service for at least one of creating, integrating, hosting, maintaining, and deploying computer-readable code in the control hardware, said code being executed by the computer processor to implement: said detecting and sensing, said retrieving, said tracking said status, said analyzing, said determining said values, said generating said score, said executing, said generating said recommendations, said presenting, said receiving, and said enabling.

8. An electronic device waste recycling method comprising:

detecting and sensing via a wireless sensor of a specialized mobile hardware device comprising special purpose hardware, by a processor of the mobile hardware device via a network scan, a plurality of electronic devices at a location associated with a user of said specialized mobile hardware device, wherein said special purpose hardware comprises electronic circuitry comprising a programmable logic array utilizing state information of specialized firmware program code configured to execute specialized software for personalizing said electronic circuitry for performing said electronic device waste recycling method;

retrieving, by said processor via said sensor, identification data identifying each device of said plurality of electronic devices;

tracking, by said processor via said wireless sensor, a status for each said device, wherein said status indicates a power function status for each said device, a condition of each said device, a frequency of use status for each said device, and a device usage status for each said device;

analyzing, by said processor based on said identification data and each said status, said plurality of electronic devices with respect to electronic waste data in an electronic waste repository;

identifying, by said processor via said wireless sensor, precious metals within said plurality of electronic devices;

determining, by said processor, values for said plurality of electronic devices with respect to recycling options;

generating, by said processor based on said values, a score for each electronic device of said plurality of electronic devices with respect to said values and said recycling options;

executing, by said processor based on each said score, a comparative analysis for said plurality of electronic devices with respect to said values, said precious metals, and said recycling options;

generating, by said processor based on results of said comparative analysis, recommendations associated with said values and said recycling options;

presenting, by said processor to said user via said mobile hardware device, said recommendations;

receiving, by said processor from said user via said mobile hardware device, a recycling option selection with respect to said recommendations, wherein said recycling option selection comprises selecting an e-waste pickup option with respect to said plurality of electronic devices; and enabling, by said processor, a recycling process associated with said recycling option selection, wherein said recycling process comprises:

generating an optimal travel route for traveling between a recycling facility and said location associated with said user for retrieval of at least one of said plurality of electronic devices;

presenting said optimal travel route to a driver associated with said recycling facility; and directing said driver such that said driver retrieves said at least one of said plurality of electronic devices and travels from said location to said recycling facility via said optimal travel route for disposal of said at least one of said plurality of electronic devices at said recycling facility.

9. The method of claim 8, wherein said determining said usage pattern comprises:
tracking software usage, tasks, or usage frequency of said first device.

10. The method of claim 8, wherein said determining said usage pattern comprises:
presenting to said user, via said mobile hardware device, a survey associated with usage of said first device; and
retrieving, by said processor from said user, responses to said survey.

11. A computer program product, comprising a computer readable hardware storage device storing a computer readable program code, said computer readable program code comprising an algorithm that when executed by a processor of a specialized mobile hardware device comprising special purpose hardware implements an electronic device waste recycling method, said method comprising:
detecting and sensing via a wireless sensor of said mobile hardware device, by said processor via a network scan, a plurality of electronic devices at a location associated with a user of said specialized mobile hardware device, wherein said special purpose hardware comprises electronic circuitry comprising a programmable logic array utilizing state information of specialized firmware program code configured to execute specialized software for personalizing said electronic circuitry for performing said electronic device waste recycling method;
retrieving, by said processor via said wireless sensor, identification data identifying each device of said plurality of electronic devices;
tracking, by said processor via said wireless sensor, a status for each said device, wherein said status indicates a power function status for each said device, a condition of each said device, a frequency of use status for each said device, and a device usage status for each said device;
analyzing, by said processor based on said identification data and each said status, said plurality of electronic devices with respect to electronic waste data in an electronic waste repository;
identifying, by said processor via said wireless sensor, precious metals within said plurality of electronic devices;
determining, by said processor, values for said plurality of electronic devices with respect to recycling options;
generating, by said processor based on said values, a score for each electronic device of said plurality of electronic devices with respect to said values and said recycling options;
executing, by said processor based on each said score, a comparative analysis for said plurality of electronic devices with respect to said values, said precious metals, and said recycling options;
generating, by said processor based on results of said comparative analysis, recommendations associated with said values and said recycling options;
presenting, by said processor to said user via said mobile hardware device, said recommendations;
receiving, by said processor from said user via said mobile hardware device, a recycling option selection with respect to said recommendations, wherein said recycling option selection comprises selecting an e-waste pickup option with respect to said plurality of electronic devices; and
enabling, by said processor, a recycling process associated with said recycling option selection, wherein said recycling process comprises:
generating an optimal travel route for traveling between a recycling facility and said location associated with said user for retrieval of at least one of said plurality of electronic devices;
presenting said optimal travel route to a driver associated with said recycling facility; and
directing said driver such that said driver retrieves said at least one of said plurality of electronic devices and travels from said location to said recycling facility via said optimal travel route for disposal of said at least one of said plurality of electronic devices at said recycling facility.

12. The computer program product of claim 11, wherein said sensor is selected from the group consisting of an RFID tag reader, a Wi-Fi sensor, and a Bluetooth sensor.

13. The computer program product of claim 11, wherein said determining said values for said plurality of electronic devices comprises:
determining current resale values for said plurality of electronic devices;
determining material values for materials comprised by said plurality of electronic devices;
determining current trade in values for said plurality of electronic devices; and
determining recycling royalty values associated with recycling said plurality of electronic devices.

14. The computer program product of claim 13, wherein said determining current resale values comprises;
determining a current physical and operating condition for said plurality of electronic devices; and
analyzing a profile of said user, wherein said profile comprises resale vendor criteria associated with user preferred resale vendors and resale vendors located within a specified geographical area.

15. The computer program product of claim 13, wherein said determining material values comprises;
identifying precious metal values for said precious metals comprised by said plurality of electronic devices; and
analyzing a profile of said user, wherein said profile comprises resale vendor criteria associated with user preferred resale vendors and resale vendors located within a specified geographical area.

16. The method of claim 13, wherein said determining material values comprises;
identifying retailer or manufacturer customer retention incentives associated with retailers or manufactures associated with said plurality of electronic devices; and
analyzing a profile of said user, wherein said profile comprises resale vendor criteria associated with user preferred resale vendors and resale vendors located within a specified geographical area.

* * * * *